US012774045B2

(12) United States Patent
Dylewski, II et al.

(10) Patent No.: US 12,774,045 B2
(45) Date of Patent: Oct. 27, 2026

(54) LOW PROFILE BEDSLIDE LOAD BAR ASSEMBLY

(71) Applicant: Leer Group, Elkhart, IN (US)

(72) Inventors: Eugene A. Dylewski, II, Granger, IN (US); Harley Harrison, South Bend, IN (US); Michael A. Sislo, Dexter, MI (US)

(73) Assignee: Truck Accessories Group, LLC, Houston, TX (US)

( * ) Notice: Subject to any disclaimer, the term of this patent is extended or adjusted under 35 U.S.C. 154(b) by 407 days.

(21) Appl. No.: 18/382,753

(22) Filed: Oct. 23, 2023

(65) Prior Publication Data

US 2024/0132165 A1 Apr. 25, 2024
US 2024/0227953 A9 Jul. 11, 2024

Related U.S. Application Data

(60) Provisional application No. 63/419,252, filed on Oct. 25, 2022.

(51) Int. Cl.
*B62D 33/08* (2006.01)
*B62D 33/02* (2006.01)

(52) U.S. Cl.
CPC .............. *B62D 33/08* (2013.01); *B62D 33/02* (2013.01)

(58) Field of Classification Search
CPC ...................................................... B62D 33/08
USPC ......................................................... 296/1.01
See application file for complete search history.

(56) References Cited

U.S. PATENT DOCUMENTS

| | | | |
|---|---|---|---|
| 5,688,087 | A | 11/1997 | Stapleton et al. |
| 5,934,725 | A | 8/1999 | Bowers |
| 6,065,792 | A | 5/2000 | Sciullo et al. |

(Continued)

FOREIGN PATENT DOCUMENTS

| | | | |
|---|---|---|---|
| GB | 2578736 | A | 5/2020 |
| WO | 2004082993 | A1 | 9/2004 |
| WO | 2019164837 | A1 | 8/2019 |

OTHER PUBLICATIONS

International Search & Written Opinion; Date of Mailing May 6, 2024; PCT/US2024/12555; Leer Group; "Bedslide No Drill Mounting Bracket".

(Continued)

*Primary Examiner* — Amy R Weisberg
*Assistant Examiner* — Philip C Adams
(74) *Attorney, Agent, or Firm* — Barnes & Thornburg LLP

(57) ABSTRACT

A low profile load bar assembly for a bedslide assembly is provided. The bedslide includes a deck, at least one longitudinally extending track, at least one low profile load bar assembly, and a load bar track. The at least one low profile load bar assembly is movably positionable on the at least one longitudinally extending track. The at least one low profile load bar assembly includes at least one low profile sliding standoff movably coupled to the at least one longitudinally extending track. The at least one low profile sliding standoff includes a load bar support that extends from the connector flange adjacent the deck. The load bar support is located adjacent to the at least one longitudinally extending track.

(Continued)

The load bar support includes a load bar opening sized and configured to receive the load bar track, and the load bar track is located adjacent to the deck.

20 Claims, 21 Drawing Sheets

(56) References Cited

U.S. PATENT DOCUMENTS

| | | | | |
|---|---|---|---|---|
| 7,134,154 | B2 * | 11/2006 | Cloer | A47C 19/025 5/310 |
| 9,227,547 | B2 | 1/2016 | Williams | |
| 9,789,800 | B2 | 10/2017 | Thygesen | |
| 10,800,465 | B2 * | 10/2020 | Schuling | B60R 9/06 |
| 10,829,059 | B1 | 11/2020 | Addison et al. | |
| 11,052,828 | B2 * | 7/2021 | Huisman | B60P 7/0815 |
| 11,440,459 | B1 | 9/2022 | Nunn | |
| 2002/0180231 | A1 | 12/2002 | Fox | |
| 2018/0037274 | A1 | 2/2018 | Mathis | |
| 2018/0118077 | A1 | 5/2018 | Ferkul et al. | |
| 2020/0039588 | A1 | 2/2020 | Standifer | |
| 2020/0406986 | A1 | 12/2020 | Sosnowich et al. | |
| 2021/0129922 | A1 | 5/2021 | Agarwal et al. | |

OTHER PUBLICATIONS

Extended European Search Report Dated Nov. 14, 2023; Application No. EP 20881050.7-1009 / 4051540 PCT/US2020058128.

Statement of Admitted Prior Art executed by Gene Dylewski at Leer Group on May 10, 2024.

Photo of Bedslide Tie Down Ring, Not Dated.

International Preliminary Report on Patentability & Written Opinion; Date of Mailing May 8. 2025; PCT/US2024/12555; Leer Group; "Bedslide No Drill Mounting Bracket".

Notification Concerning Transmittal of International Preliminary Report on Patentability; Date of Mailing May 8. 2025; PCT/US2024/12555; Leer Group; "Bedslide No Drill Mounting Bracket".

International Search & Written Opinion; Date of Mailing Aug. 1, 2023; PCT/US2023/023045; Leer Group; "Bedslide Load Bar Assembly".

International Search & Written Opinion; Date of Mailing Dec. 29, 2023; PCT/US2023/035791; Leer Group; "Bedslide Load Bar Assembly".

* cited by examiner

LOW PROFILE BEDSLIDE LOAD BAR ASSEMBLY

RELATED APPLICATIONS

The present application relates to and claims priority to U.S. Provisional Patent Application, Ser. No. 63/419,252, filed on Oct. 25, 2022. The subject matter disclosed in that Provisional Application is hereby expressly incorporated into the present Application.

TECHNICAL FIELD AND SUMMARY

The present disclosure relates to trucks such as pickup trucks and truck beds or cargo boxes used on pickup trucks and like vehicles. In particular, the present disclosure relates to a bedslide assembly affixed to the cargo box and includes one or more movable low profile load bar assemblies to assist in corralling and/or securing objects or articles on the bedslide.

A truck bed or cargo box is a large open space of a pickup truck located behind the cab section. The cargo box is typically composed of a floor bounded by opposing sidewalls. A bulkhead wall extends between the opposed sidewalls and is located adjacent the cab section. A tailgate is located opposite the bulkhead wall at the rear end of the cargo box and is movable between open and closed positions.

An illustrative embodiment of the present disclosure provides a bedslide assembly. The bedslide includes a deck, at least one longitudinally extending track, at least one low profile load bar assembly, and a load bar track. The at least one low profile load bar assembly is movably positionable on the at least one longitudinally extending track. The at least one low profile load bar assembly includes at least one low profile sliding standoff movably coupled to the at least one longitudinally extending track. The at least one low profile sliding standoff includes at least one slider engageable with the at least one longitudinally extending track and is attached to a connector flange. The at least one low profile sliding standoff further includes a load bar support that extends from the connector flange adjacent the deck. The load bar support is located adjacent to the at least one longitudinally extending track. The load bar support includes a load bar opening sized and configured to receive the load bar track. An end of the load bar track is located adjacent to the at least one longitudinally extending track.

In the above and other embodiments, the bedslide assembly may further comprise: the load bar track is located adjacent to the deck; a second longitudinally extending track extending about parallel with the at least one longitudinally extending track, wherein the at least one low profile load bar assembly includes a second low profile sliding standoff, wherein a second load bar support extends from the second low profile sliding standoff and supports the load bar track distal from the at least one low profile sliding standoff; the load bar track includes a longitudinally extending channel configured to receive accessories; the at least one low profile sliding standoff includes a plate that sits on top of the at least one longitudinally extending track; the plate extends from a top surface of the load bar support; the at least one low profile sliding standoff includes a plurality of sliders extending from an underside of the at least one low profile sliding standoff; the load bar support includes a track tab that fits into a portion of the load bar track to support the load bar track; a plurality of low profile load bar assemblies are engageable with the at least one longitudinally extending track; and each of the plurality of low profile load bar assemblies are movable to a plurality of locations on the at least one longitudinally extending track.

Another illustrative embodiment of the present disclosure provides a bedslide assembly. The bedslide includes a deck, at least one longitudinally extending track, at least one low profile load bar assembly, and a load bar track. The least one longitudinally extending track is located adjacent the deck. The at least one low profile load bar assembly is movably positionable on the at least one longitudinally extending track. The at least one low profile load bar assembly includes at least one low profile sliding standoff movably coupled to the at least one longitudinally extending track. The at least one low profile sliding standoff further includes a load bar support that extends therefrom adjacent the deck. The load bar support includes a load bar opening sized and configured to receive the load bar track. And the load bar track is located adjacent to the deck.

In the above and other embodiments, the bedslide assembly may further comprise: the at least one low profile sliding standoff includes at least one slider engageable with the at least one longitudinally extending track and attached to a connector flange; the load bar support extends from a connector flange that is part of the at least one low profile sliding standoff; the load bar support is located adjacent to the at least one longitudinally extending track; an end of the load bar track is located adjacent to the at least one longitudinally extending track; and a second longitudinally extending track extending about parallel with the at least one longitudinally extending track, wherein the at least one low profile load bar assembly includes a second low profile sliding standoff, wherein a second load bar support extends from the second low profile sliding standoff and supports the load bar track distal from the at least one low profile sliding standoff.

Another illustrative embodiment of the present disclosure provides a bedslide assembly. The bedslide includes a deck, at least one longitudinally extending track, at least one low profile load bar assembly, and a load bar track. The at least one low profile load bar assembly is movably positionable on the at least one longitudinally extending track. The at least one low profile load bar assembly includes at least one low profile sliding standoff movably coupled to the at least one longitudinally extending track. The at least one low profile sliding standoff includes at least one slider engageable with the at least one longitudinally extending track and attached to a connector flange. The at least one low profile sliding standoff further includes a load bar support that extends from the connector flange adjacent the deck. The load bar support is located adjacent to the at least one longitudinally extending track. The load bar support includes a load bar opening sized and configured to receive the load bar track, and the load bar track is located adjacent to the deck.

In the above and other embodiments, the bedslide assembly may further comprise: a second longitudinally extending track extending about parallel with the at least one longitudinally extending track, wherein the at least one low profile load bar assembly includes a second low profile sliding standoff, wherein a second load bar support extends from the second low profile sliding standoff and supports the load bar track distal from the at least one low profile sliding standoff; the at least one low profile sliding standoff includes a plate that sits on top of the at least one longitudinally extending track; and the plate extends from a top surface of the load bar support.

Additional features and advantages of the bedslide assembly will become apparent to those skilled in the art upon consideration of the following detail description of the illustrated embodiments exemplifying carrying out the bedslide assembly as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Corresponding reference characters indicate corresponding parts throughout the several views. The exemplification set out herein illustrates embodiments of the bulkhead clamp assembly, and such exemplification is not to be construed as limiting the scope of the bulkhead clamp assembly in any manner.

DETAIL DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a bedslide assembly that sets onto the cargo box floor and is extendable and retractable relative thereto. For example, the bedslide may be slid over the cargo box floor and contained within the truck bed. Conversely, the bedslide may be pulled from the cargo box not unlike a drawer pulled from a cabinet.

As part of the present disclosure herein, a movable bedslide assembly is provided that includes a movable load bar assembly to assist in corralling and/or securing objects on the deck of the bedslide.

Figure 1:
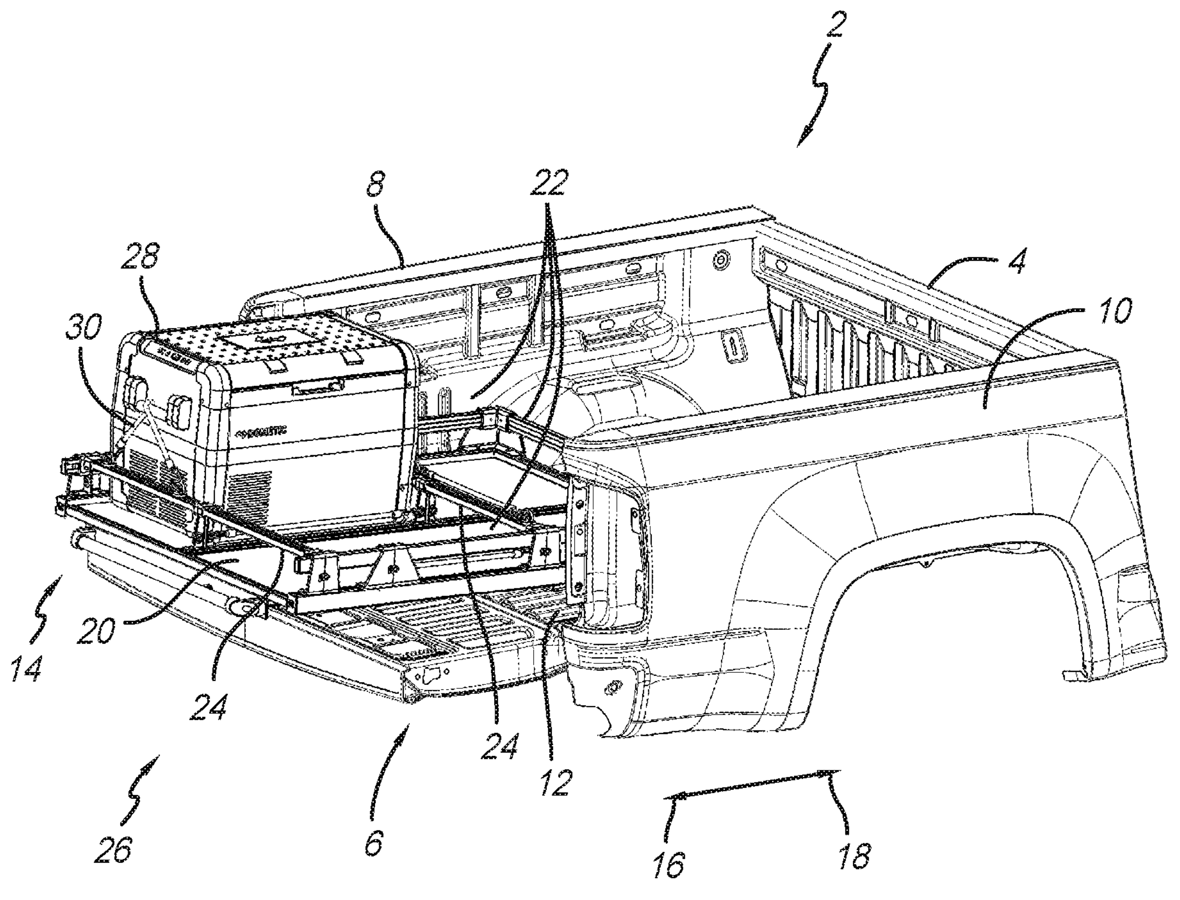
FIG. 1 is a perspective view of a cargo box portion of a pickup truck with a bedslide located in an extended position over the tailgate.
Figure 2:
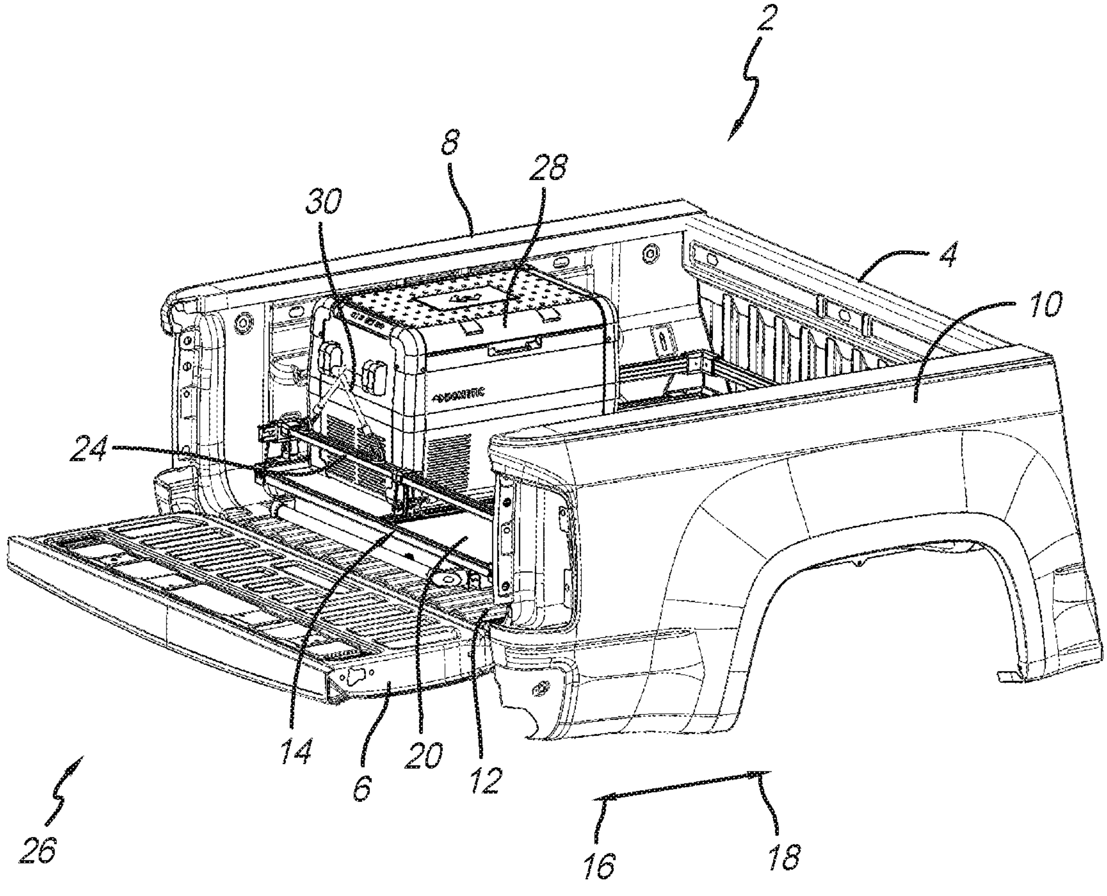
FIG. 2 is another perspective view of the cargo box portion of a pickup truck with the bedslide located in a retracted position.

Perspective and top views of a cargo box 2 from a pickup truck are shown in FIGS. 1, 2, 3, and 4. The views shown in FIGS. 1 and 2 are perspective views of cargo box 2, which include a bulkhead 4 at the front, a pivoting tailgate 6 at the rear, and opposing side walls 8 and 10 extending upward from a floor 12. Both views in FIGS. 1 and 2 show tailgate 6 in its lowered open position. Also shown in these views is a bedslide 14 located over floor 12 of cargo box 2. The view in FIG. 1 also shows bedslide 14 located in its extended position, a portion of which is located over tailgate 6. The view in FIG. 2, in contrast, shows bedslide 14 recessed in cargo box 2 in its stowed position. Bedslide 14 is movable back and forth according to directional arrows 16 and 18.

Bedslide 14 includes a deck 20 with rails 22 illustratively positioned at the periphery of the sides and bulkhead end. Load bar assemblies 24 are also included extending from one side of bedslide 14 to the other. One load bar assembly 24 is movably located adjacent tailgate end 26 of bedslide 14 and a second load bar assembly 24 is movably located about midway over deck 20 of bedslide 14. The use of one or more load bar assemblies 24 may be employed on a bedslide for purposes of corralling articles setting on the bedslide and/or segregating sections of the bedslide deck. In so doing, load bar assemblies 24 may assist in maintaining articles at particular locations on the bedslide deck.

As shown in FIGS. 1 through 4, for example, a container 28 is located on deck 20 of bedslide 14 and is restricted in movement by load bar assemblies 24 located fore and aft of container 28. It will be appreciated by the skilled artisan upon reading this disclosure that employing load bar assemblies 24, as illustratively shown, container 28 may have limited or no movement. This allows the remainder of deck 20 to be clear for other uses. It is further appreciated that other articles, such as tools, boxes, or almost anything else that can be carried by bedslide 14, may be held to a certain predesignated position with the assistance of one or more load bar assemblies 24.

Figure 3:
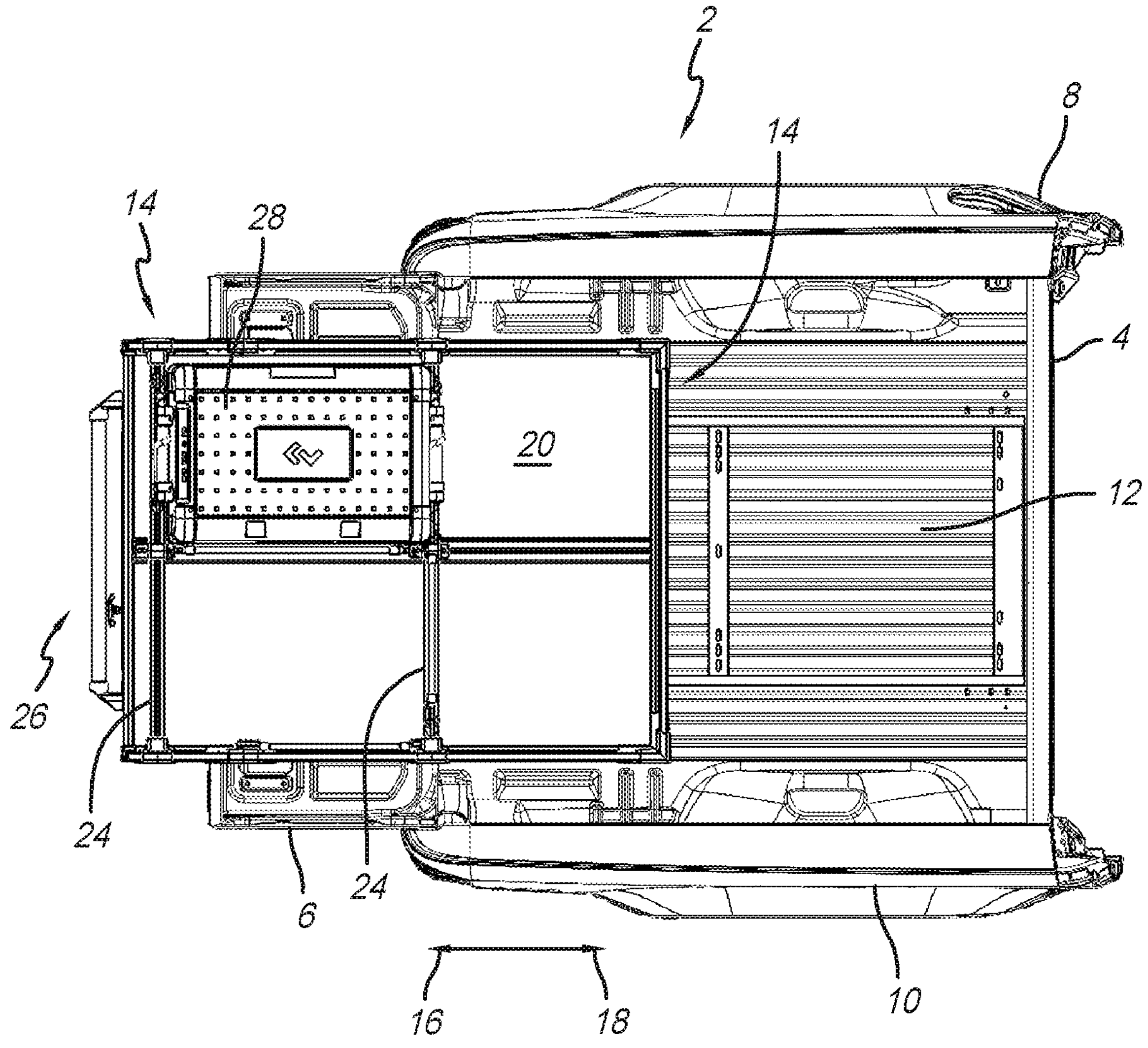
FIG. 3 is a top view of a cargo box portion of a pickup truck with a bedslide located in an extended position over the tailgate.
Figure 4:
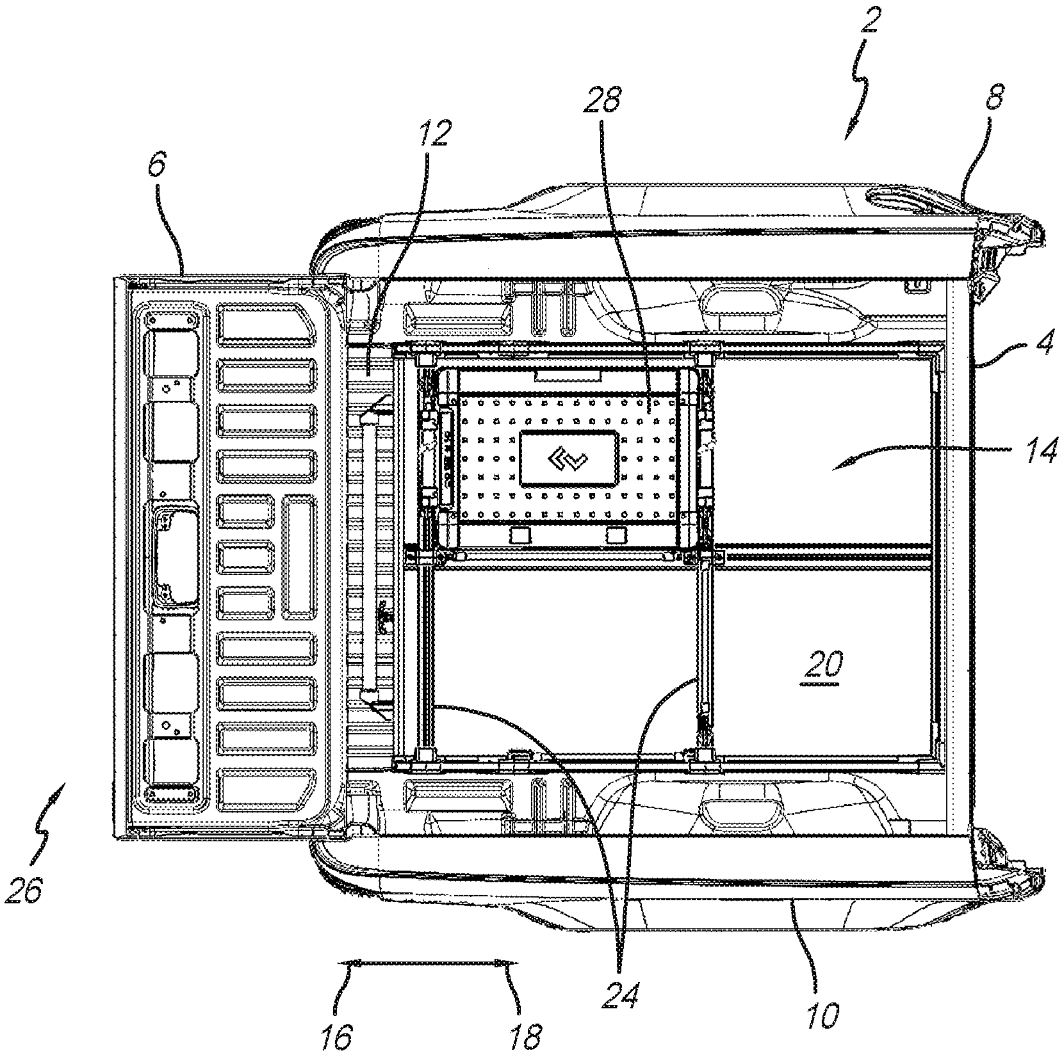
FIG. 4 is another top view of the cargo box portion of a pickup truck with the bedslide located in a retracted position.

The top views shown in FIGS. 3 and 4 further demonstrate the utility of load bar assemblies 24. The view in FIG. 3 differs from that in FIG. 4, like that shown between FIGS. 1 and 2, in that bedslide 14 is moved according to directional arrow 16 to an extended position at least partially over lowered tailgate 6. Conversely, as shown in FIG. 4, the bedslide is retracted in direction 18, into cargo box 2, and over floor 12. These views further depict how load bar assemblies 24 are employed to corral or limit movement of container 28 (or any other article) to assist in limiting its movement on deck 20 of bedslide 14. Each of load bar assemblies 24 may be slidable in directions 16 and 18 as indicated by the directional arrows shown.

Illustratively, load bar assemblies 24 may be positioned orthogonally to that shown to provide the same functions, but from side to side rather than front to rear. As further shown in FIGS. 1 through 3, bungee cords 30, straps or other tie down systems may be used in conjunction with load bar assemblies 24 to further assist in limiting movement of articles supported by deck 20. Because load bar assemblies 24 may be adjusted to move along deck 20 of bedslide 14 to almost any position or configuration, the user may be able to customize how deck 20 of bedslide 14 is segregated to suit individual needs.

Figure 5:
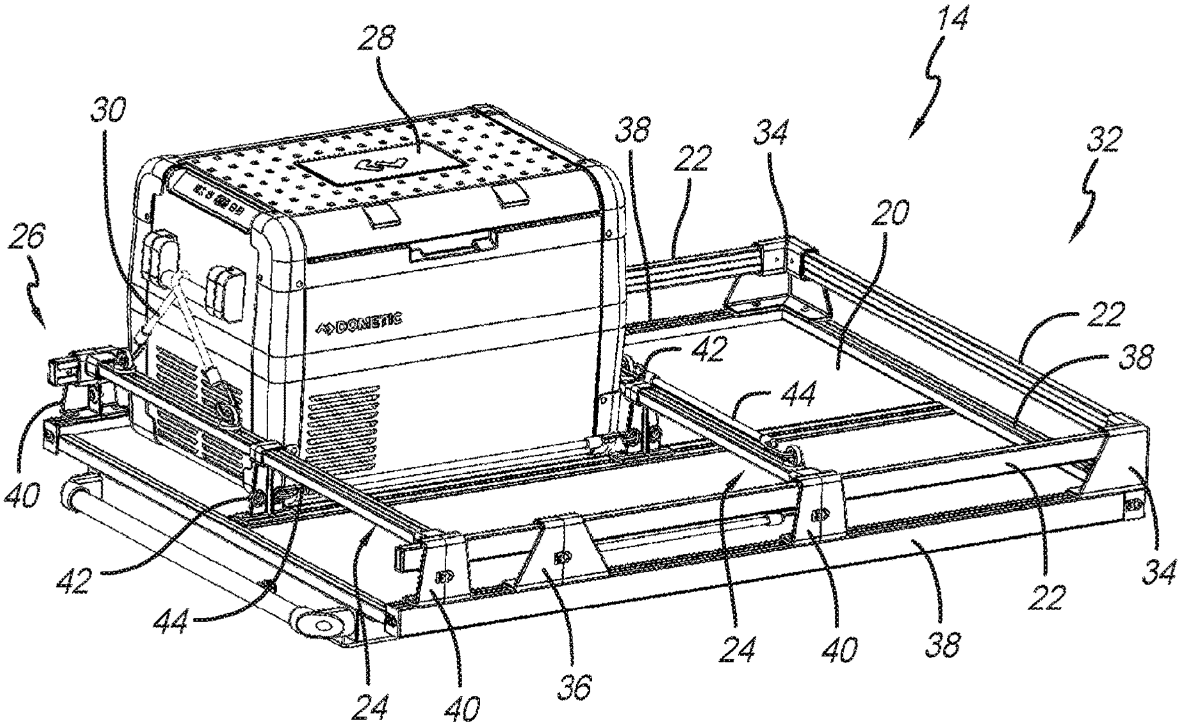
FIG. 5 is an isolated perspective view of the bedslide.
Figure 6:
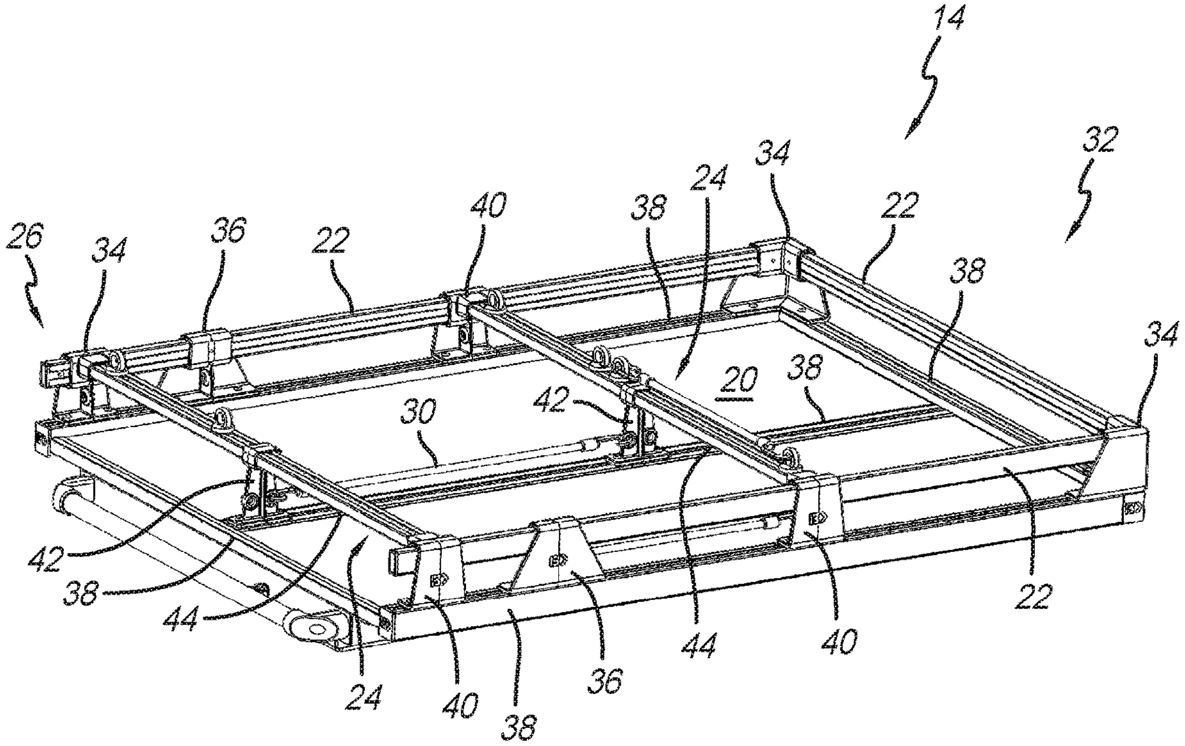
FIG. 6 is another isolated perspective view of the bedslide.
Figure 9:
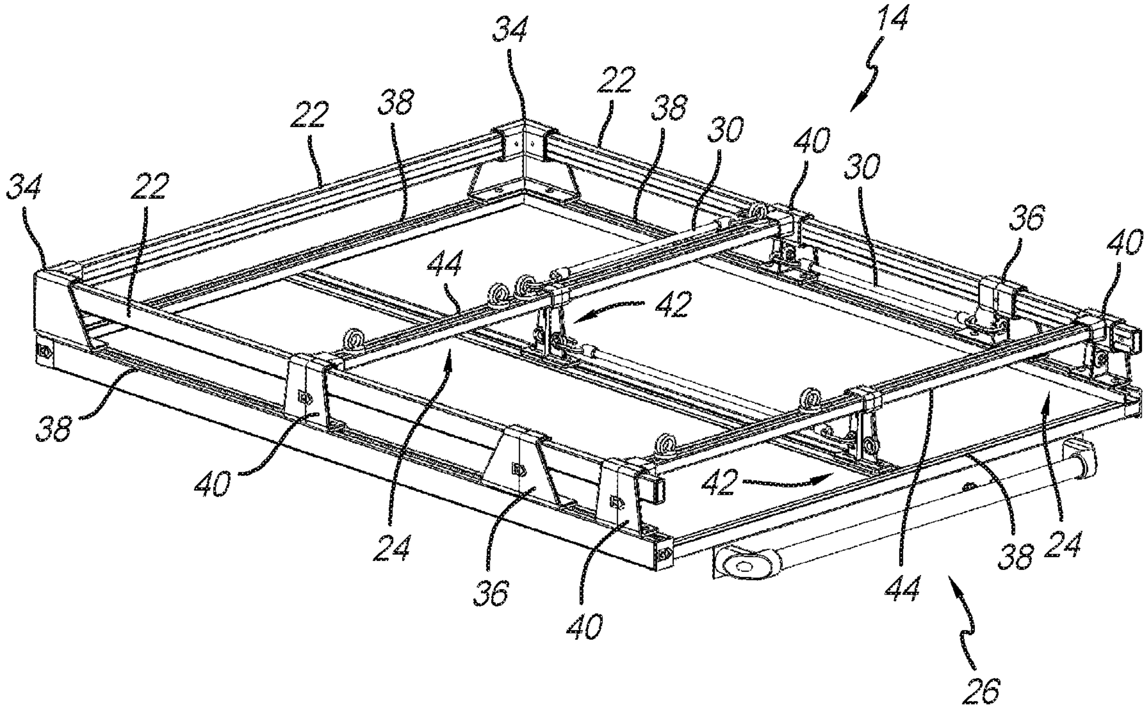
FIG. 9 is another perspective of the bedslide with the load bar assembly located thereon.

Isolated perspective views of bedslide 14 are shown in FIGS. 5, 6, and 9. The difference between the views is that illustrative container 28 is shown supported by bedslide 14 in FIG. 5, whereas, no such container 28 is shown supported by bedslide 14 in FIG. 6 or 9. Again, container 28 is shown for demonstrative purposes only. Other articles may be carried by bedslide 14 and held in position by at least one or more load bar assemblies 24. Shown in these views is bedslide 14, including railings 22, surrounding each side and bulkhead end 32 of bedslide 14. Corner standoffs 34 are located at the corners of bulkhead end 32 of bedslide 14, support railings 22 on the sides, and bulkhead end 32. Railings 22 are also illustratively supported by standoffs 36 that are coupled to tracks 38, located adjacent deck 20, on the sides of bedslide.

Load bar assemblies 24 are located at tailgate end 26 of bedslide 14, as well as over a portion of deck 20. It is appreciated that bedslide 14 can be located at any position over deck 20 of bedslide 14. Each of load bar 24 assemblies are supported by a sliding standoff 40 positioned on the track, as well as an illustrative center support standoff 42 positioned on track 38, located within deck 20 of bedslide 14. As shown in the perspective views of bedslide 14 in both FIGS. 6, bungee cord 30 (or alternatively, strap, separator, or other similar structure) may extend between the center support standoffs 42 of each load bar assembly 24. Such bungee cord 30 may further assist in retaining the illustrative container 28 in position on deck 20 of bedslide 14. It is appreciated from these views in FIGS. 6 and 9, that each of load bar assemblies 24 may be positioned at any location from bulkhead end 32 to tailgate end 26 along bedslide deck 20 by positioning a load bar assembly 24 to any desired position along tracks 38, as shown. This provides versatility to position load bar assemblies 24 in any desired location based on the needs of segregating sections of deck 20 and/or limiting movement of any article supported on deck 20.

Figure 7:
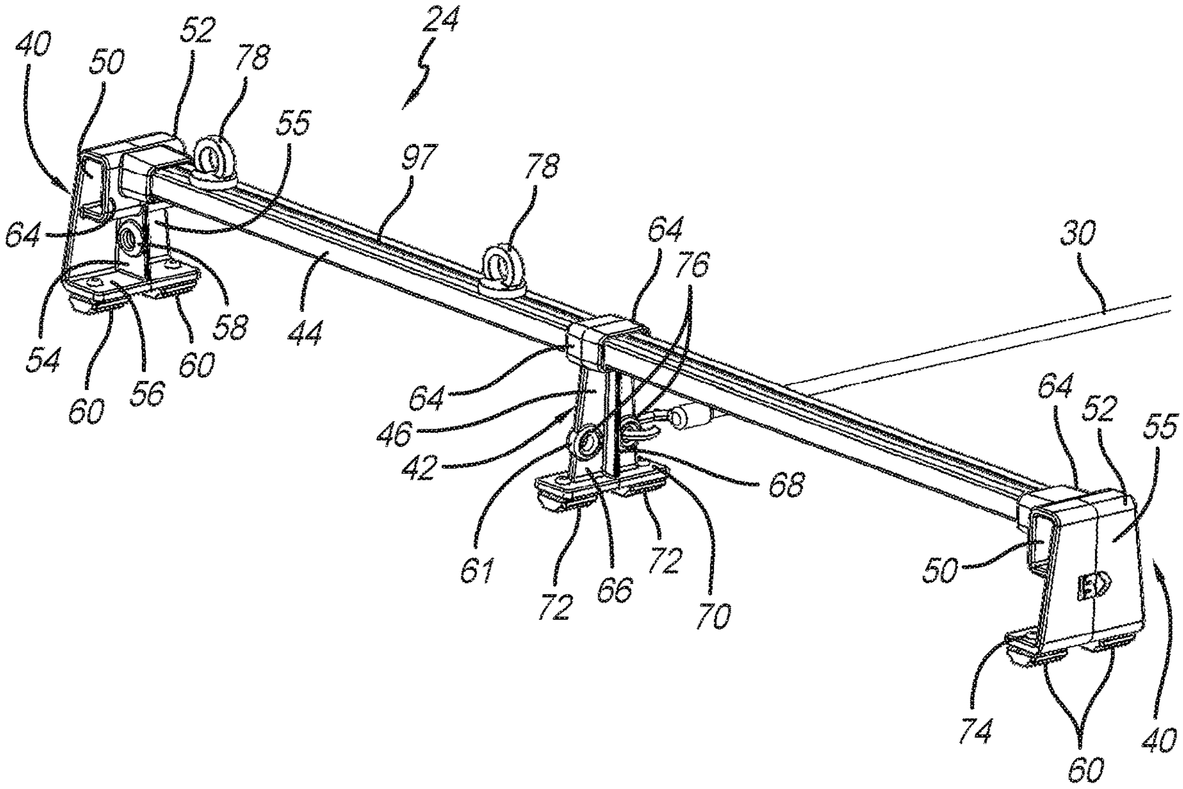
FIG. 7 is an isolated perspective view of a load bar assembly.

An isolated perspective view of load bar assembly 24 is shown in FIG. 7. This view shows a load bar track 44 with a channel 97 disposed longitudinally therethrough being supported by sliding standoffs 40 at each end and a center support standoff 42 therebetween. Sliding standoffs 40 are configured to support load bar track 44 above deck 20 of bedslide 2. Each sliding standoff 40 illustratively includes a railing opening 50 disposed through railing support 52 to receive a portion of a railing 22 from bedslide 14. Each of the sliding standoffs 40 are configured to move along railing 22 to any desired position along bedslide 14. A brace 54 extends from a base 56, along a wall 55, to the periphery of the railing support 52 that forms railing opening 50. Illustratively, an eyelet 58 is disposed through brace 54 to allow bungee cord 30 hooks, strap hooks or the like, to attach thereto. One or more sliders 60 on base 56 allows sliding standoff 40 to slide along tracks 38 of bedslide 14, which are typically positioned under railings 22. This allows the load bar assembly 24 to slide along track 38 and railing 22 to any position on bedslide 24. Load bar track 44 is disposed in a load bar support 64 on the sliding standoff 40 to raise load bar track 44 off deck 20. It is appreciated that the position of load bar support 64 and, thus, the height of load bar track 44, may be determined from the positioning of load bar support 64 off of deck 20. This height off deck 20 may be any amount from nominal (or imperceptible) to several inches or more.

The load bar track 44 is also supported by a load bar support 64 on the center support standoff 42, which is slidably coupled to track 38, located within deck 20, of bedslide 14. Center support standoff 42 also includes a wall 46 and brace 68 that extends load bar support 64 from its base 70, similar to the sliding standoff 40. Sliders 72, on center support standoff 42, within channel 6 of track 38 in deck 20 of bedslide 14, allows positioning of the center support standoff 42 in similar fashion to that of sliding standoffs 40. A fastener 74 or other like means may be employed to engage slider 72 to lock center support standoff 42 (as well as sliding standoffs 40) to secure load bar assembly 24 to the desired position on bedslide 14. Bungee cord 30, illustratively shown, attaches to one of eyelets 76 on center support standoff 42. There are also eyelets 78 located on the channel of the load bar track. Eyelets 78 provide versatility for further assisting securement of articles on bedslide 14. It is appreciated that multiple load bar assemblies 24 may be positioned on bedslide 14 as needed to segregate sections of bedslide 14 and/or assist in securing articles with respect to bedslide 14.

Figure 8:
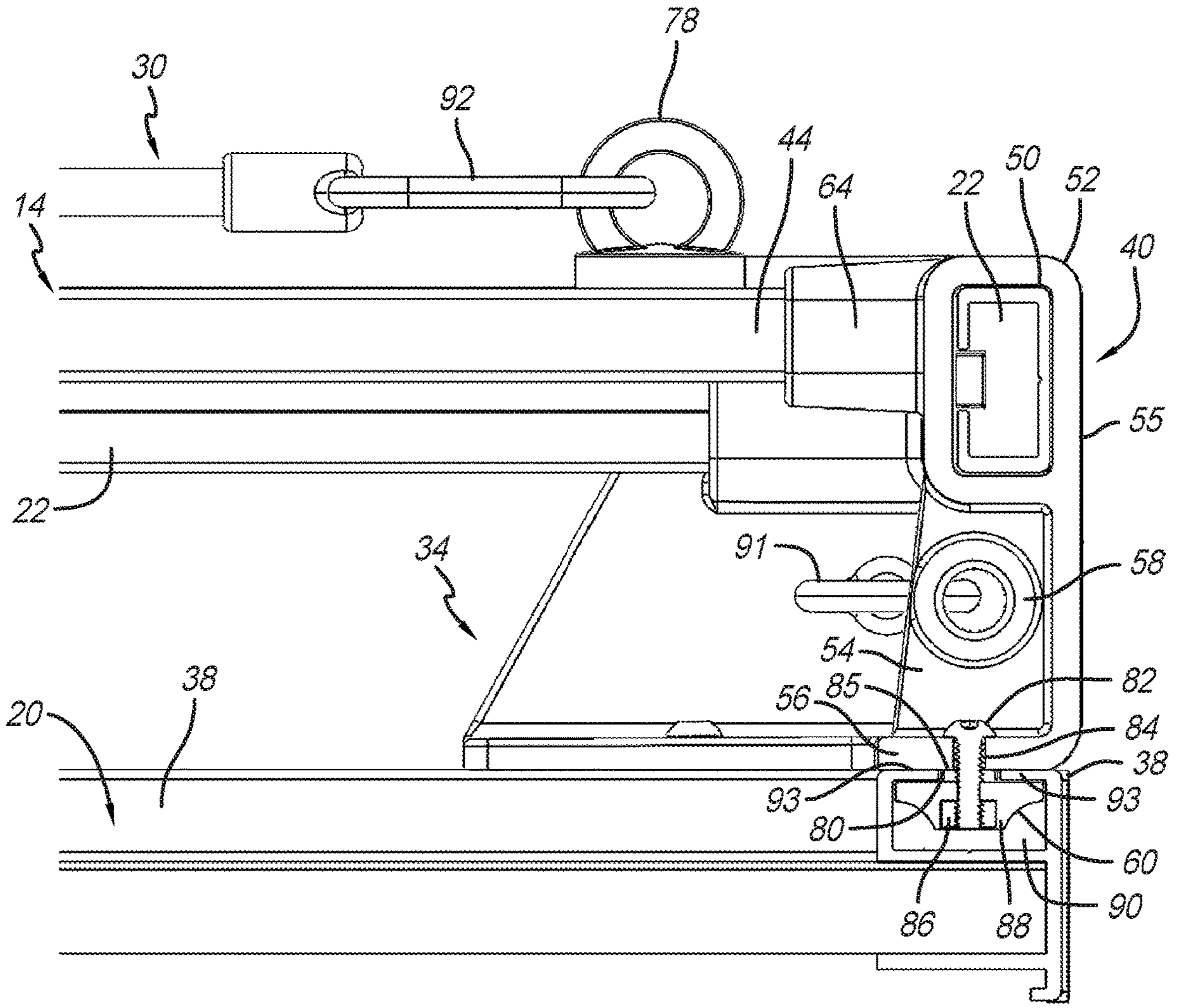
FIG. 8 is a detail sectional view of a portion of the bedslide.

A detail sectional view of a portion of bedslide 14 is shown in FIG. 8. This view depicts sliding standoff 40 coupled to track 38 and supporting a load bar track 44. As illustratively shown, sliding standoff 40 includes railing support 52 with railing opening 50 disposed therethrough configured to receive railing 22 of bedslide 14. Wall 55 connects railing support 52 to base 56, which sets on track 38. Slider 60 is shown attached to base 56 via a web 80 allowing sliding standoff 40 to be coupled to track 38 and slide therewith. A fastener 82 or like connector may be disposed through an opening 84 in base 56 and into slider 60 to lock sliding standoff 40 into any desired position along track 38. This may be accomplished by a nut 86 positioned within a captivated nut bore 88 in slider 60 (see FIG. 12). It is noted that channel 90, within track 38, includes opening 85 through which fastener 82 is extended, as well as web 80 to allow the connection and securement of sliding standoff 40 with respect to track 38.

Brace 54 extends from base 56 to railing support 52. Wall 55 and brace 54 are sized to allow railing 22 to fit within railing opening 50 of railing support 52, as well as contribute to the height load bar track 44 will set off of deck 20 of bedslide 14. Also shown is load track bar support 64, which receives load bar track 44 and suspends it over deck 20. Illustratively, eyelet 58 in the brace may be used for a bungee cord 30 or strap hook 91. Eyelet 78 may also be attached, as shown, to load bar track 44 to allow bungee cord 30 or strap hook 92 to engage for further tie down or attachment functionality. Also shown in this view is corner standoff 34 and railing 22.

Figure 10:
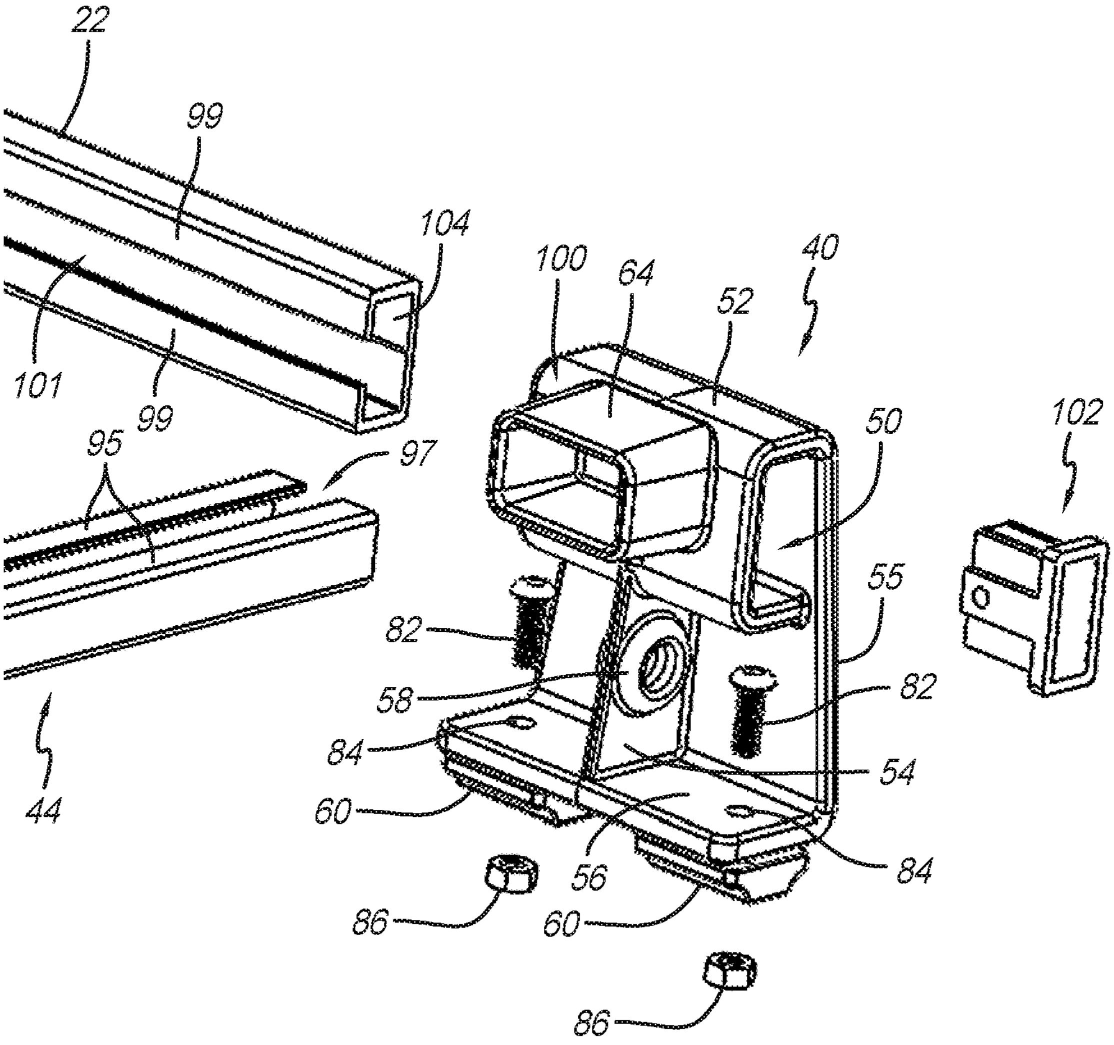
FIG. 10 is an exploded view of a sliding standoff with a railing and load bar track portion of the load bar assembly.

An exploded view of a sliding standoff 40, with railing 22 and load bar track 44, is shown in FIG. 10. Sliding standoff 40 further depicts railing support 52, which is supported by wall 55 extending from base 56. Brace 54 is also shown extending from railing support 52, wall 55, and base 56. Load bar track support 64, with its load bar track support opening 100, receives and holds up load bar track 44. In similar fashion, railing opening 50 receives the railing. Sliding standoff 40 is movable along the length of this railing 22. An opening cap 102 may be inserted into channel 104 of railing 22 to shroud the end of same. Further shown is eyelet 58 illustratively disposed through brace 54 in order to allow other structures to engage same.

On the underside of base 56, opposite brace 54, are sliders 60 configured to fit within channel 90 of track 38 to allow sliding standoff 40 to slide there-along (see FIG. 8). In the illustrative embodiment, two sliders 60 on the underside of base 56 of sliding standoff 60 are shown. Illustratively, one slider 60, or more than two sliders 60, may alternatively be employed for the same purpose. Fasteners 82 are shown extendable through openings 84 disposed in base 56. When used in conjunction with nuts 86, as illustratively shown, slider 60 and base 56 can be drawn towards each other to lock sliding standoff 40 in a desired position. Also shown in this view are walls 95 that bound slot 97 of load bar track 44. Similarly, top walls 99 borders slot 101 of railing 22. These slots allow accessories to be attached to load bar track 44 and railing 22, respectively.

Figure 11:
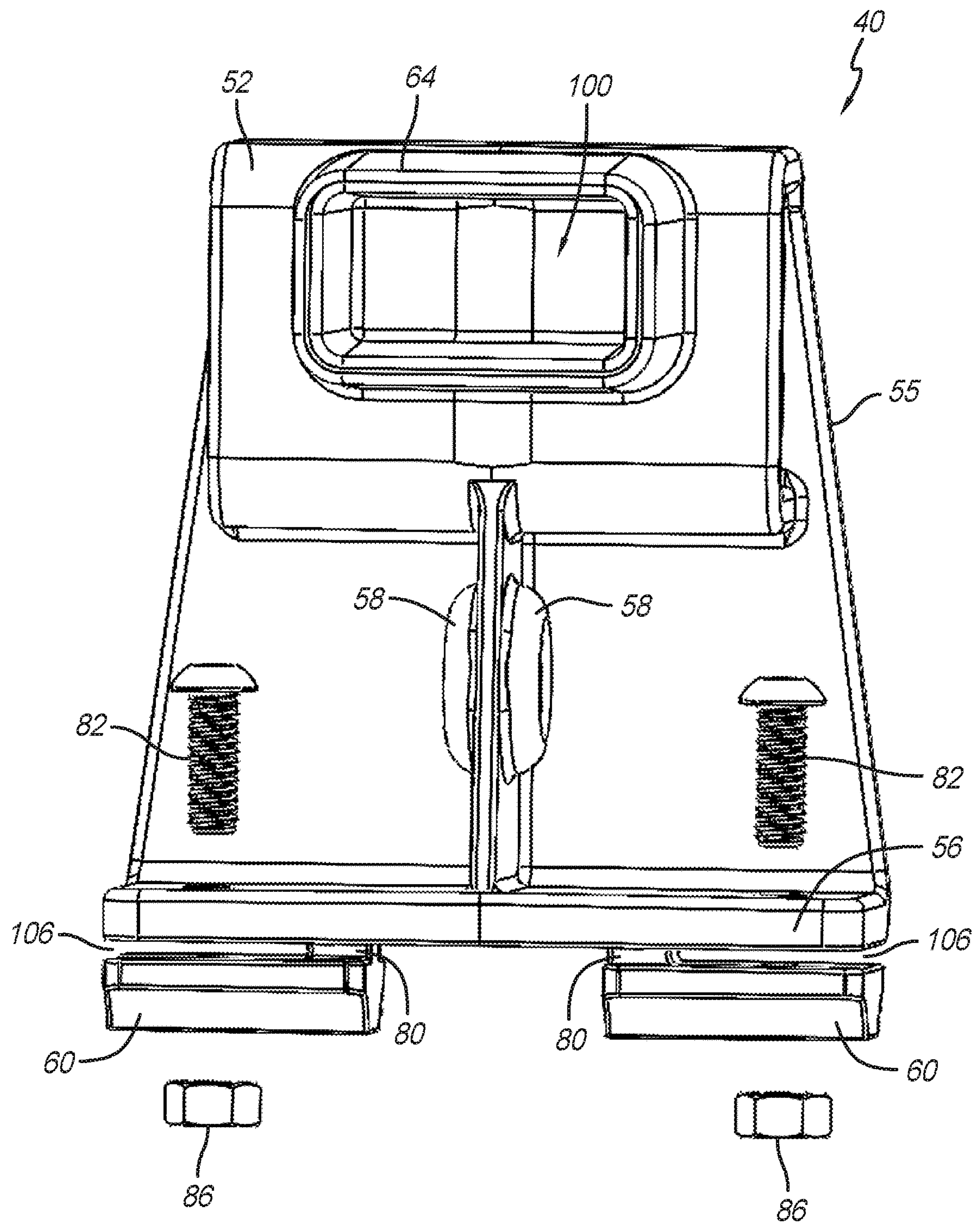
FIG. 11 is a perspective side view of the sliding standoff.

A perspective side view of sliding standoff 40 is shown in FIG. 11. Like that illustratively shown in FIG. 10, sliding standoff 40, shown in FIG. 11, includes railing support 52 and load bar track support 64 along with brace 54 and wall 55 extending from base 56. Each of sliders 60 are also shown attached to the underside of base 56. To that end, each slider includes web 80 located at an end of same for purposes of having sliders 60 attached to base 56. In the illustrated embodiment, web 80 is located adjacent an end of slider 60 so that fastener 82 can extend through slider 60 spaced apart from web 80. Also, web 80 creates a space 106 between the underside of base 56 and slider 60 so that when same is positioned inside channel 90 of track 38, there is sufficient clearance between base 56 and slider 60 to accommodate the top walls 93 of the track at the periphery of its opening 85 (see, also, FIG. 8). This arrangement allows sliding standoff 40 to move along the track without falling off. Additionally, web 80 being located at an opposite end of slider 60 allows same to flex slightly when being pulled by fastener 82 for purposes of securing sliding standoff 40 to track 38, as needed. In this illustrative embodiment, web 80 is narrower than slider 60 or base 56 so web 80 will fit within opening 85 of track 38.

Figure 12:
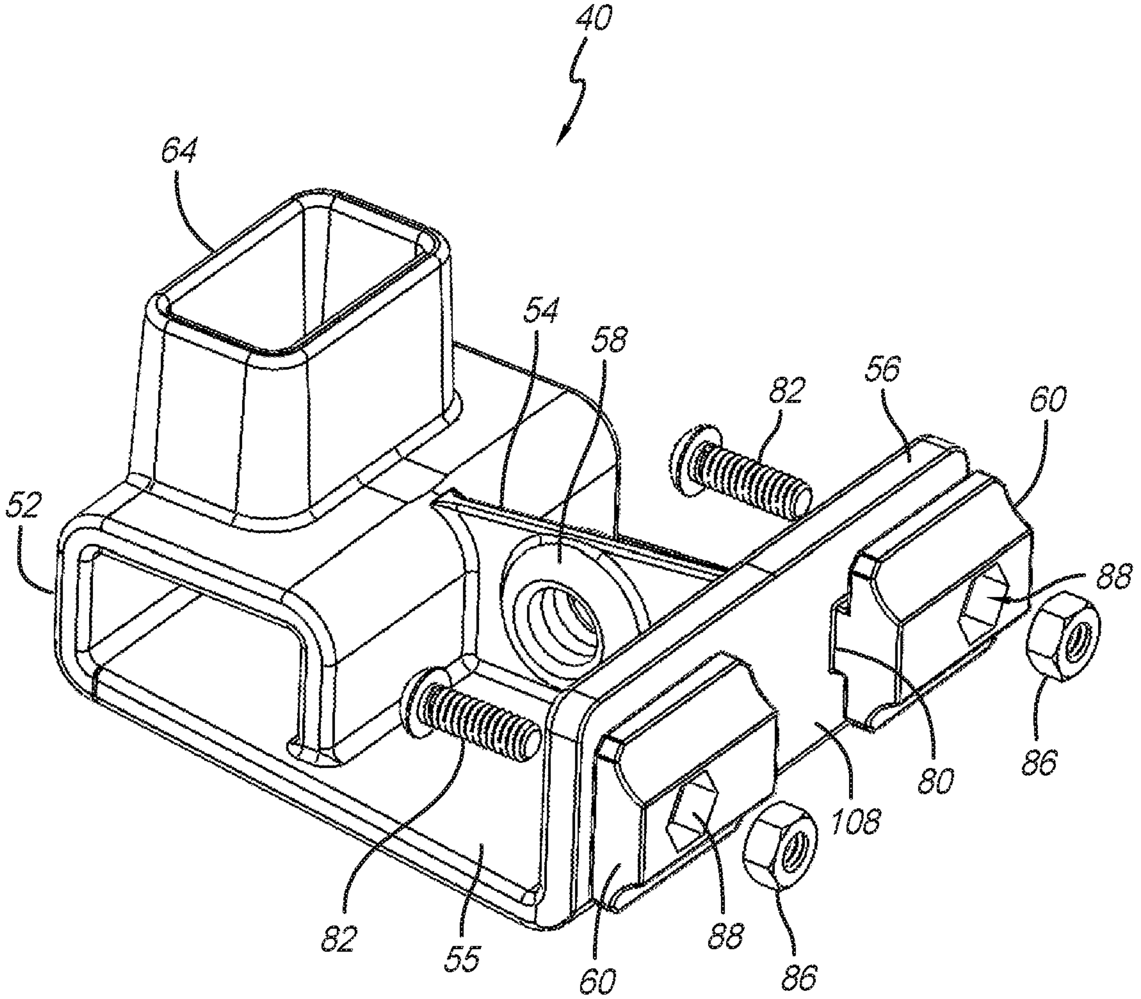
FIG. 12 is a perspective underside view of the sliding standoff.

A perspective underside view of sliding standoff 40 is shown in FIG. 12. This view, like that shown in FIGS. 10 and 11, includes railing support 52, load bar track support 64, brace 54, wall 55, eyelet 58, base 56, and sliders 60. This view further depicts web 80 attaching slider 60 to underside 108 of base 56. Again, web 80 is narrower than slider 60 in order to fit in opening 85 of track 38 and between top walls 93 (see FIG. 8). Also, further depicted in this view are captivated nut bores 88, illustratively, one in each of sliders 60. Captivated nut bore 88 is complementary shaped to nut 86 and configured to receive same to prevent it from rotating as fastener 82 is drawn through nut 86. This alleviates a need for a second wrench or socket tool to hold nut 86 while fastener 82 is being rotated.

Figure 13:
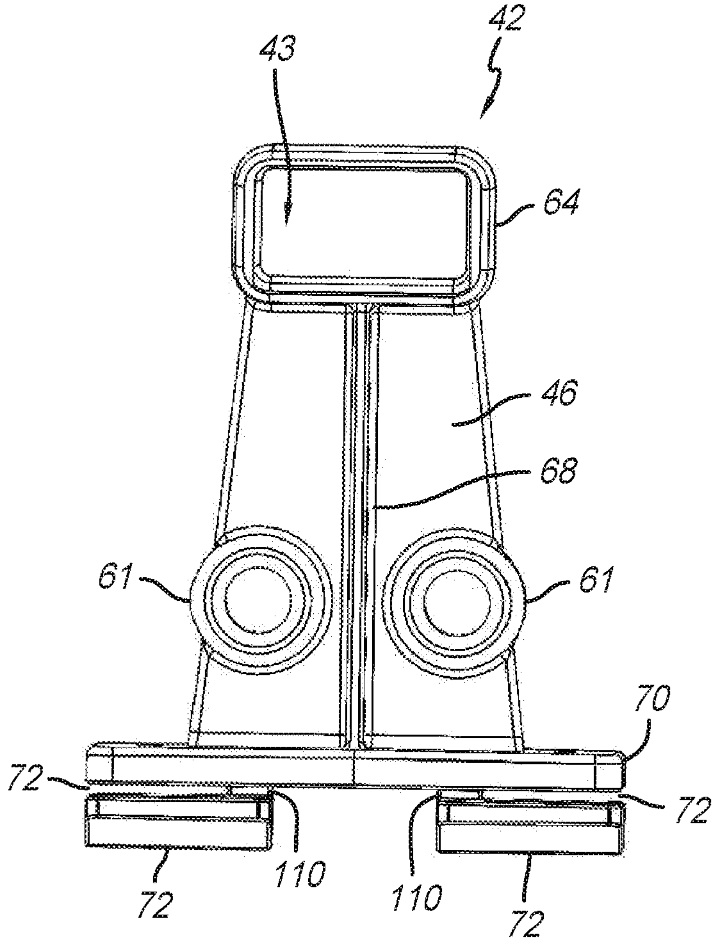
FIG. 13 is a side facing view of the center support standoff.
Figure 14:
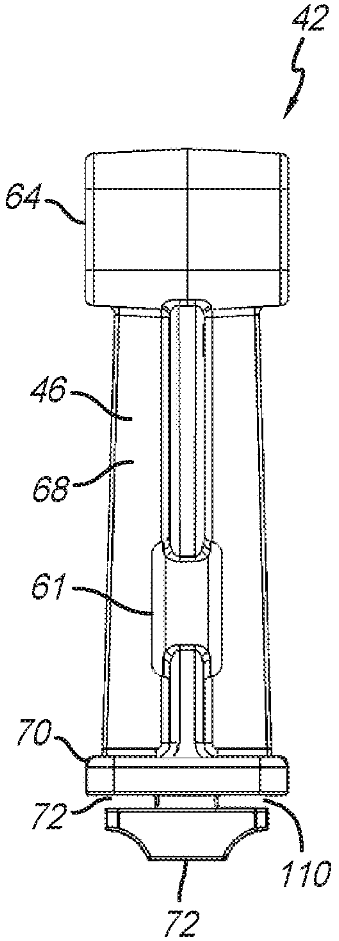
FIG. 14 is an end view of the center support standoff.
Figure 15:
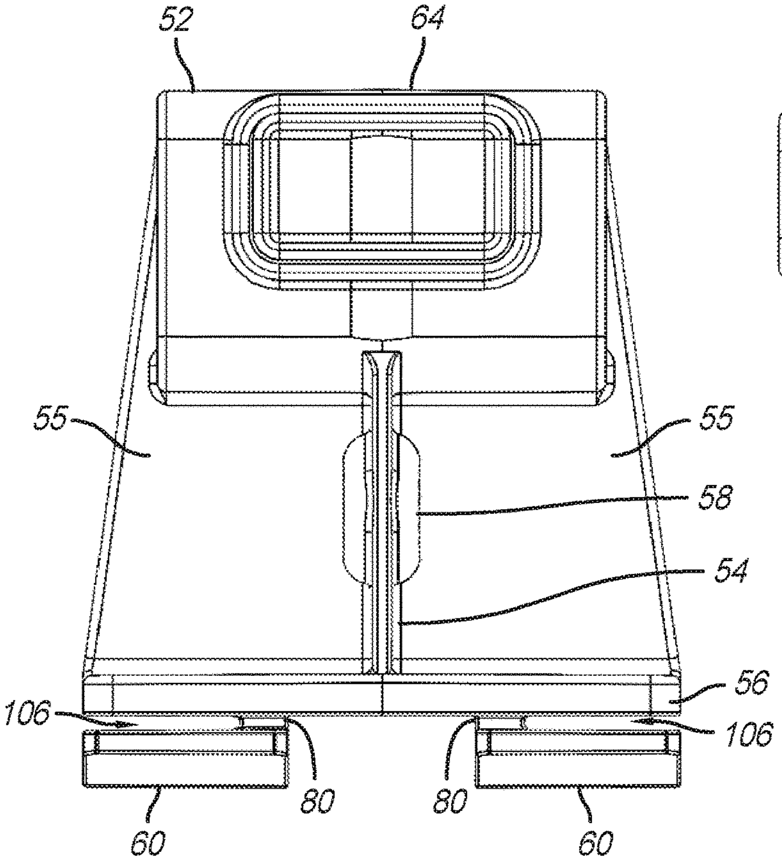
FIG. 15 is a side facing view of the sliding handoff.
Figure 16:
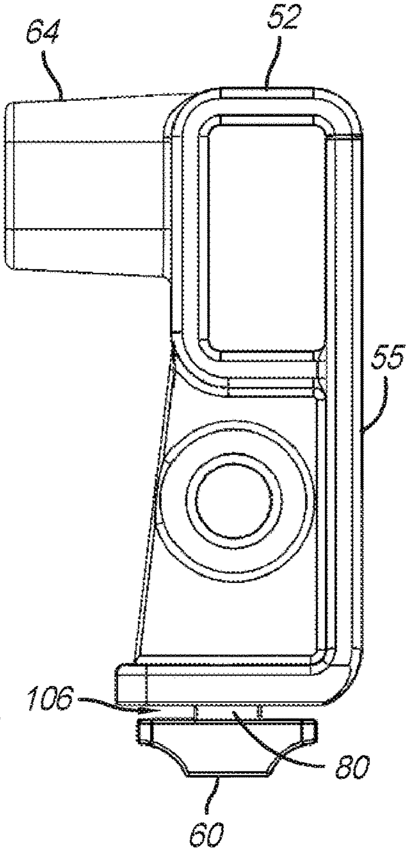
FIG. 16 is an end view of the sliding standoff.

A side facing view and end view of center support standoff 42 is shown in FIGS. 13 and 14, respectively. Both views show the load bar track support 64, as well as wall 46, brace 68, eyelet 61, base 70, and sliders 72. This view particularly shows web 110 attaching the underside of base 70 with slider 72 and being narrower to fit within opening 84 of track 38 (see FIG. 8). In similar fashion, a side facing and end view of sliding standoff 40 is shown in FIGS. 15 and 16, respectively. These views also show railing supports 52, load bar track support 64, walls 55, eyelets 58, braces 54, base 56, and sliders 60. Web 80 is also shown being narrower than slider 60, as well as being located on one end of same so fastener 82 (see FIG. 11) can draw the other end of slider 60 towards base 56, to clamp to top wall 93 of track 38 (see FIG. 8), for purposes of securing sliding standoff 40 to track 38, as desired. It is appreciated from these views that when load bar track 44 is disposed within each of sliding standoffs 40 and center support standoff 42 as part of load bar assembly 24, the entire assembly will move along tracks 38 to a desired position along bedslide 14. Once the desired position is reached, fasteners 82 can be tightened to draw sliders 60 against the underside of top walls 93 of track 38 to secure load bar assembly 24 at that desired position.

Another illustrative embodiment of the present disclosure provides a bedslide 15 with a low profile load bar assembly 112. Illustrative embodiments of such are shown in FIGS. 17 through 24. Illustratively, embodiments of low profile load bar assembly 112 include one or more low profile sliding standoff 114 that attaches to one or more sliders 116 (see FIG. 22) that fits in a track, such as track 38 disclosed in the previous embodiments. A bar support 118 (see FIG. 22) holds load bar track 120 adjacent to deck 20. It is appreciated from these views in FIGS. 17 through 24 how load bar track 120, being held adjacent deck 20, is distinguishable from the positioning of the load bar depicted in the previous embodiments. Additionally, the low profile of load bar track 120 is not coupled to the railings nor required to have standoffs (sliding or otherwise) that attach to any of the railings. Eyelets 78 or other accessories may couple to load bar track 120 similar to that described in the prior embodiments. However, load bar track 120 is not positioned as high above bedslide deck 20 as the prior embodiments.

Isolated perspective views of bedslide 15, with low profile load bar assemblies 112, are shown in FIGS. 17, 18, 19, and 20. Differences between the views include having a container 28 supported by bedslide deck 20 in FIGS. 17 and 19, as well as the configurations of the low profile load bar assemblies 112 best shown by comparing FIGS. 18 and 20. These different configurations affect the positioning of the container as demonstrated in FIGS. 17 and 19. The views shown in FIGS. 17 and 18 include low profile load bar assembly 112 spanning side to side of bedslide deck 20 at tailgate end 26 of bedslide 15. Another low profile load bar assembly 112 spans across bedslide deck 20 about midway from bulkhead end 32 to tailgate end 26 of bedslide 15.

Figure 17:
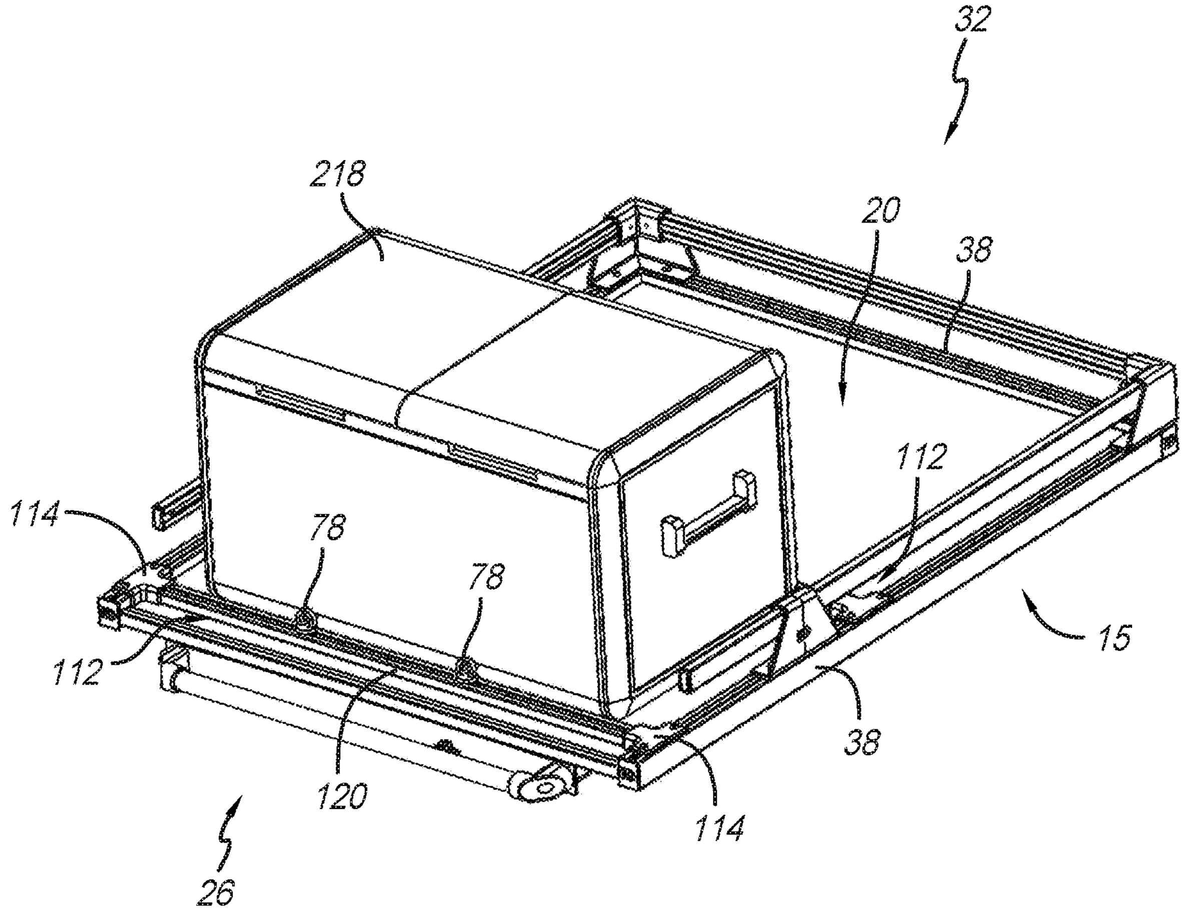
FIG. 17 is an isolated perspective view of a bedslide with a low profile load bar assembly thereon.
Figure 18:
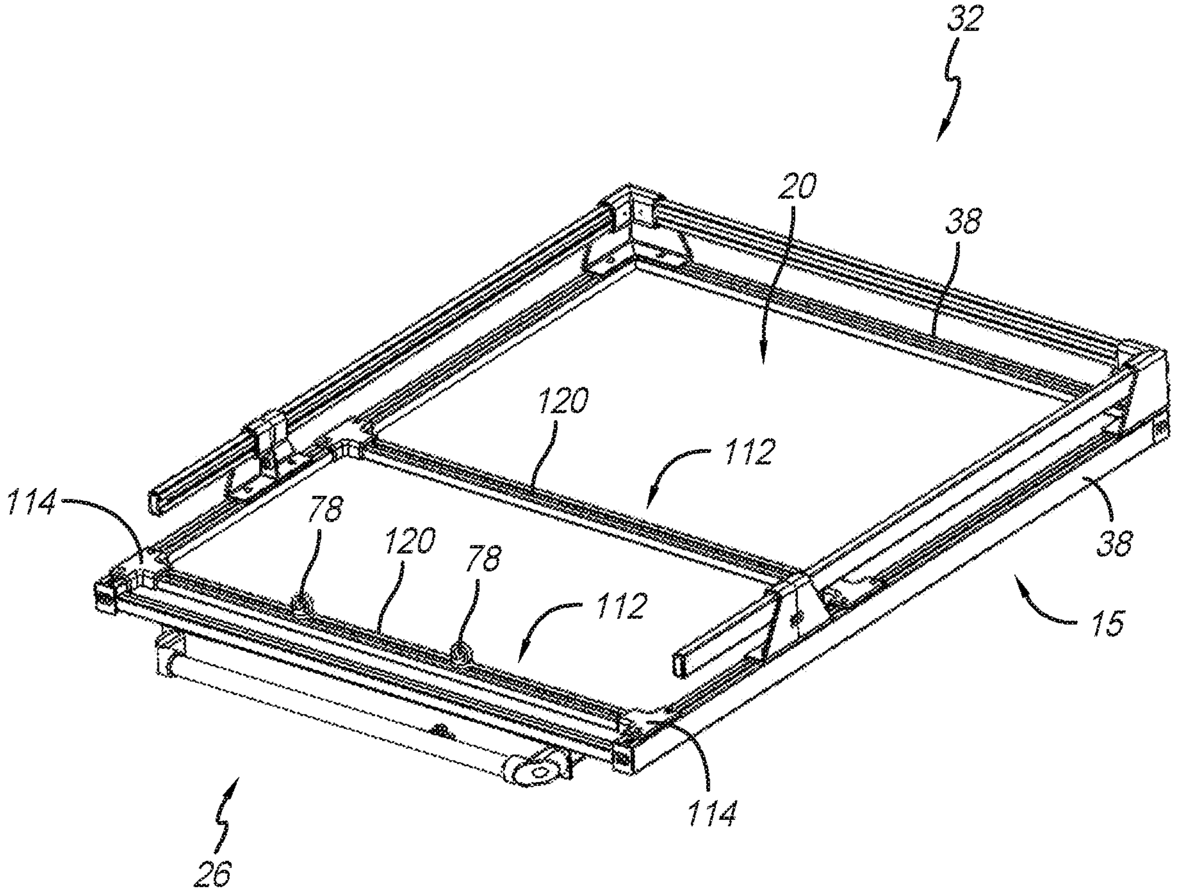
FIG. 18 is another isolated perspective view of a bedslide with a low profile load bar assembly thereon.
Figure 19:
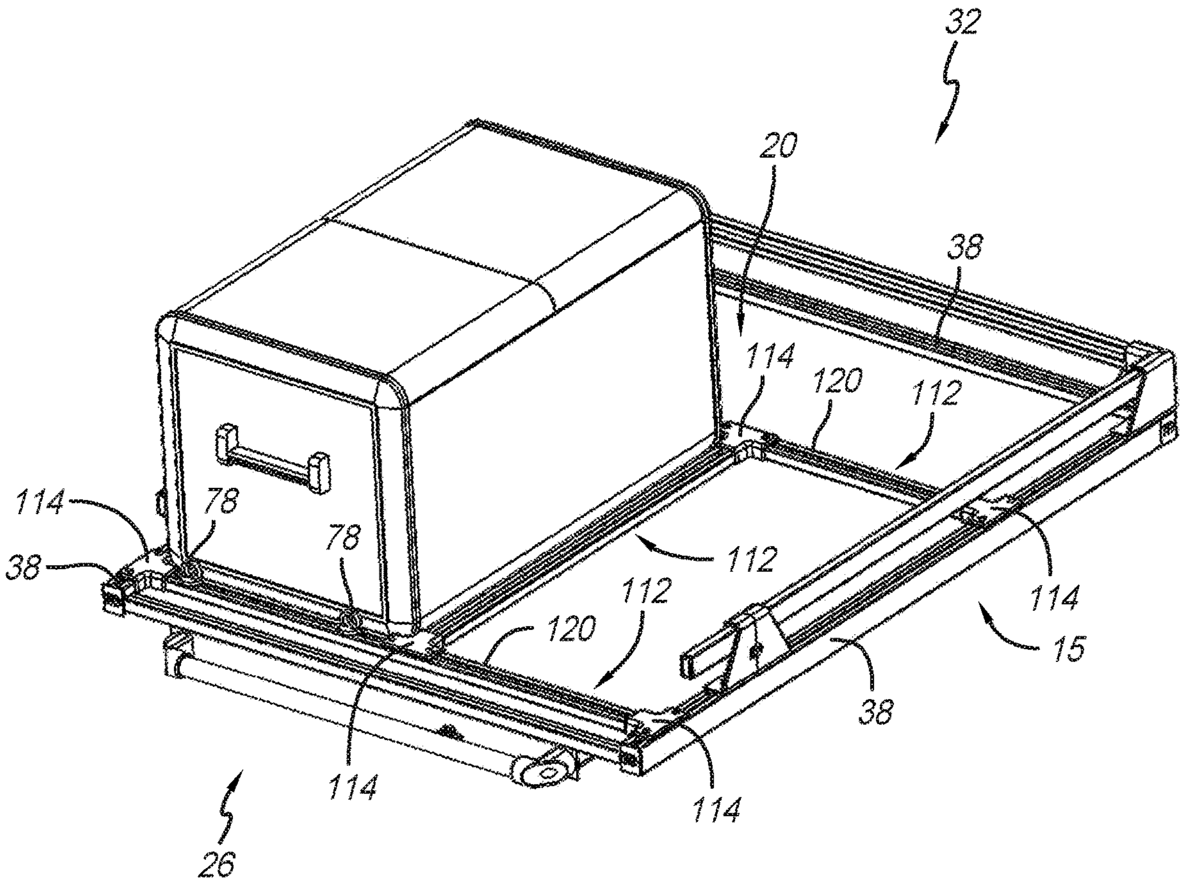
FIG. 19 is an isolated perspective view of a bedslide with a low profile load bar assemblies thereon.
Figure 20:
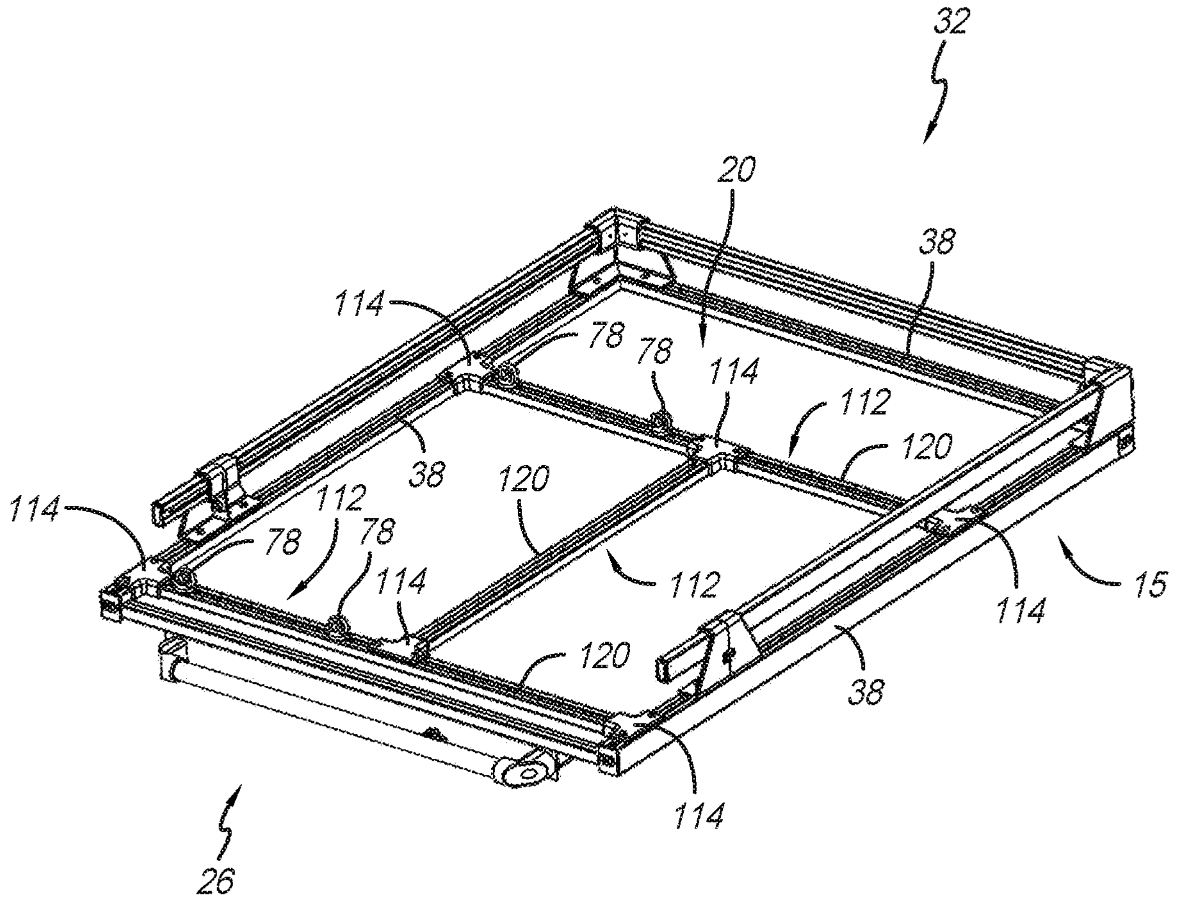
FIG. 20 is another isolated perspective view of a bedslide with a low profile load bar assemblies thereon.

The views shown in FIGS. 19 and 20 include another low profile load bar assembly 112 that illustratively spans between the two low profile load bar assemblies 112 from FIGS. 17 and 18. Like that discussed in the prior embodiments, these low profile load bar assemblies 112 assist in segregating different sections of bedslide deck 20 based on the needs of the user. Tracks 38, on each side, as well as load bar tracks 120 themselves, offer a variety of different low profile load bar assembly configurations of which these views only show a few. The skilled artisan upon reading this disclosure, however, will appreciate that these varieties of configurations fall within the scope of this disclosure based on the teachings herein.

It is further appreciated that by attaching low profile load bar assemblies 112 between other low profile load bar assemblies 112, different sections of bedslide deck 20 can be segregated without load bar tracks 120 being raised above bedslide deck 20 the same amount as that shown in the prior embodiments. Additionally, as particularly demonstrated in FIGS. 19 and 20, extending a low profile load bar assembly 112 between the two low profile load bar assemblies 112, spanning bedslide 15 from side to side, may eliminate the need for a center track formed in the bed slide deck, as illustratively employed in the prior embodiments (see FIG. 6). In other embodiments, more low profile load bar assemblies 112, or even a combination of these with the load bar assemblies 24 described in FIGS. 1 through 16, may be employed depending on the need(s) of the user.

Figure 21:
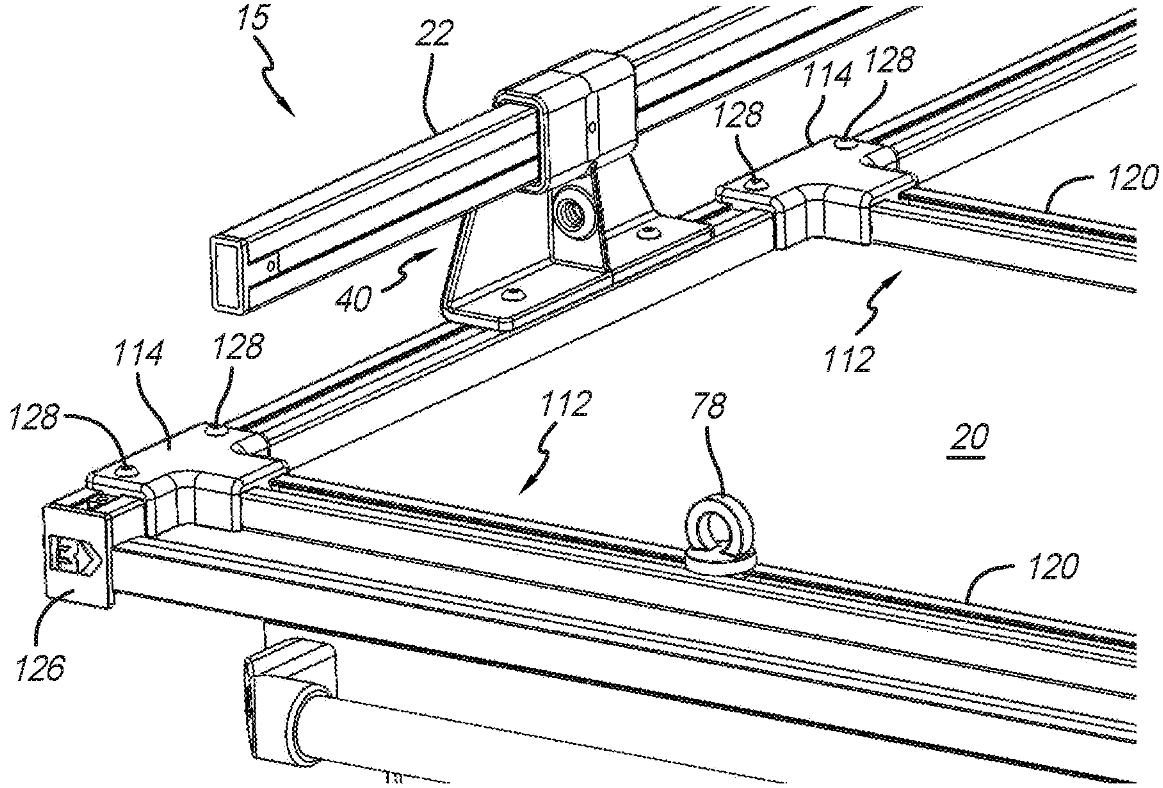
FIG. 21 is a perspective detail view of a portion of the bedslide with the low profile load bar assembly thereon.

A perspective detail view of a portion of bedslide 15 is shown in FIG. 21. This view shows the load bar track 120 affixed to the low profile sliding standoff 114, which is slidingly coupled to track 38 of bedslide 15. This view further depicts a distinction from the prior embodiments where here load bar track 120 is positioned adjacent the top surface of deck 20, whereas the prior embodiments have their load bar tracks raised well above deck height. Railing 22 shown in this view, which approximates the height of load bar track 44 from prior embodiments, helps demonstrate how much lower low profile load bar assembly 112 is from that height. This view also depicts how multiple low profile load bar assemblies 112 may be attached to track 38 as desired to segregate portions of deck 20.

Figure 22:
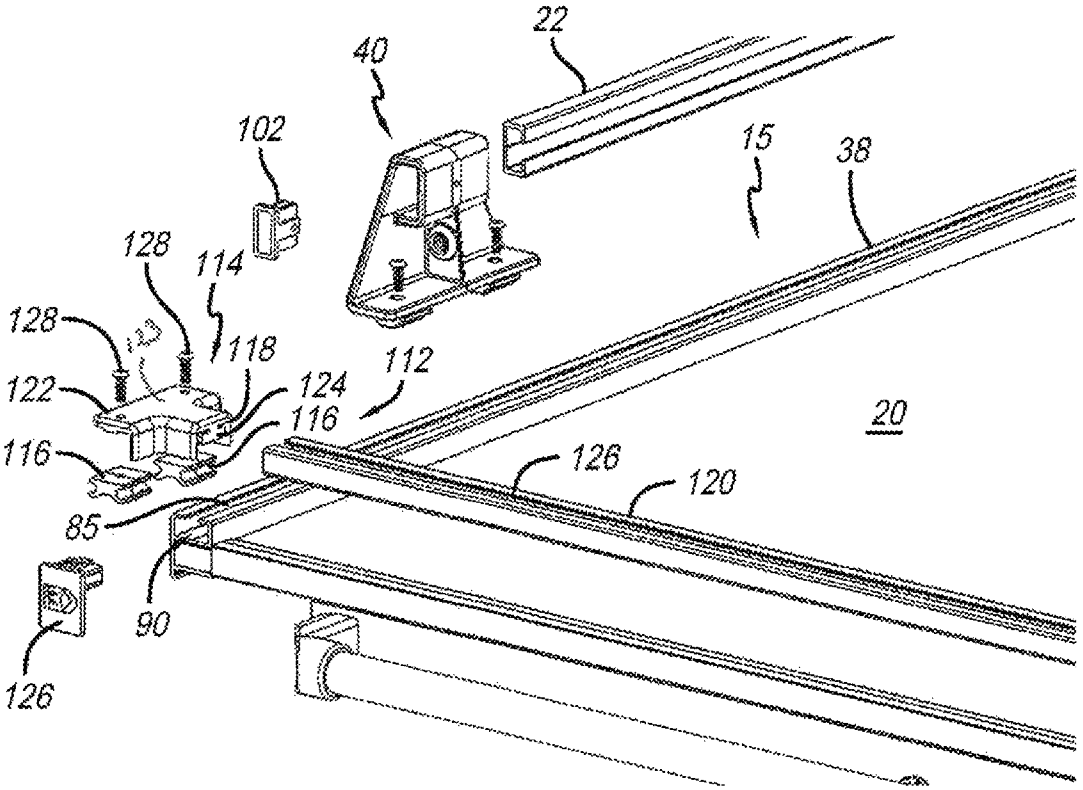
FIG. 22 is a detail perspective exploded view of a portion of the bedslide and load bar assembly.

A detail perspective exploded view of a portion of bedslide 15 and low profile load bar assembly 112 is shown in FIG. 22. This view is similar to that of FIG. 21 except for several components of low profile load bar assembly 112 being depicted in exploded view. Here, the low profile sliding standoff 114 is shown composed of bar support 118 and connector flange 122 with plate 123. Bar support 118 includes a track tab 124 that fits into channel 127 of the load bar track 120 to support same. Illustratively, track tab 124 can approximate at least a portion of the cross-sectional profile of channel 127 of load bar track 120 to fit into and support same.

Fasteners 128 extend through connector flange 122 and attach to sliders 116. Sliders 116 can be fitted into channel 90 with fasteners 128 extending through top opening 85 of track 38. Fasteners 128 may be attached loosely to sliders 116 so low profile sliding standoff 114 may be slid along channel 90 of track 38 to any desired position thereon. Fasteners 128 may then be tightened to secure low profile sliding standoff 114 (and hence low profile load bar assembly 112) at that desired position. Also shown in this view is railing 22, standoff 40, and opening cap 102 of the type described further in the prior embodiments. A cap 126 may also cover the end of channel 90 of track 38 to give bedslide 15 a more finished appearance.

Figure 23:
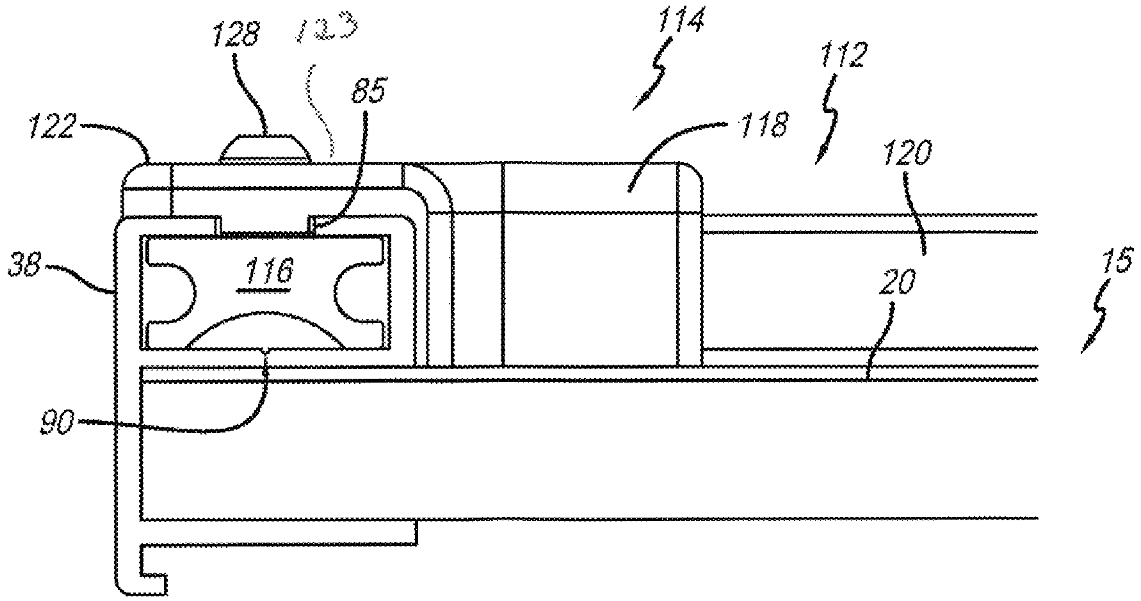
FIG. 23 is an end detail view of a portion of the bedslide deck and low profile load bar assembly.
Figure 24:
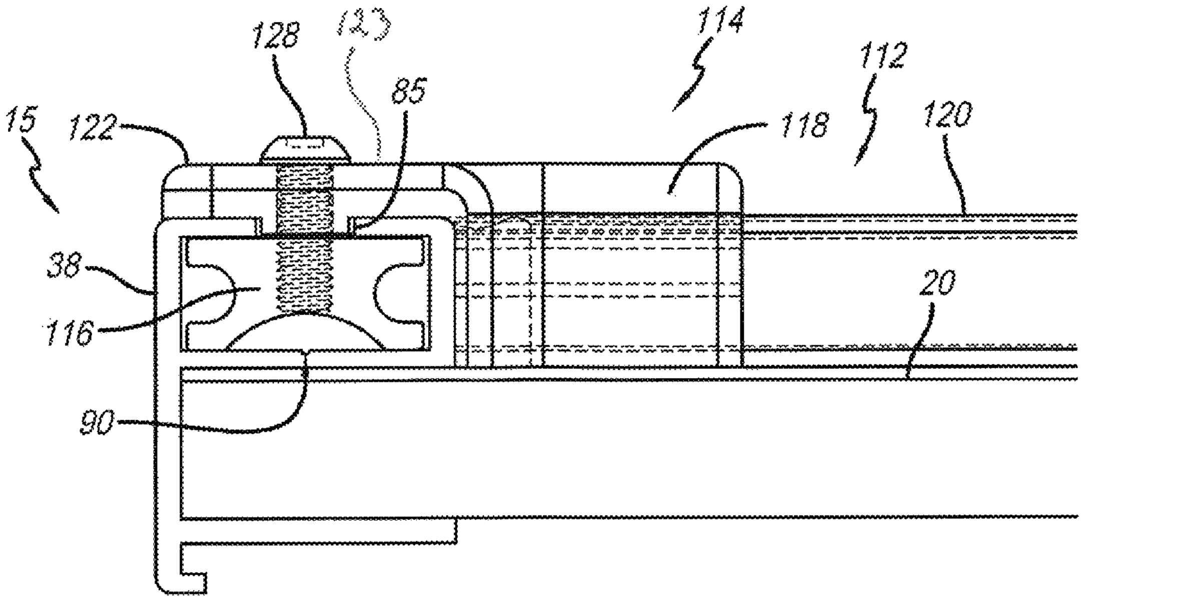
FIG. 24 is an end and partial ghost detail view of a portion of the bedslide deck and low profile load bar assembly.

An end detail view and end detail partial ghost view of a portion of bedslide deck 20 and low profile load bar assembly 112, are shown in FIGS. 23 and 24, respectively. The view in FIG. 23 depicts fastener 128 extending through connector flange 122 of low profile sliding standoff 114, opening 85 of track 38, and into slider 116. Again, when fastener 128 is loosely attached to slider 116, low profile sliding standoff 114 may move along channel 90 of track 38 to any desired location. Fastener 128 can then be tightened, sandwiching a portion of track 38 between connector flange 112 and slider 116, to prevent movement of low profile sliding standoff 114. Also shown is load bar track 120 extending from bar support 118 of low profile sliding standoff 114.

The view in FIG. 24 is similar to that of FIG. 23 with the exception that portions of fastener 128, as well as load bar track 120, are shown in ghost view. These illustrate how those components are disposed on slider 116 and bar support 118, respectively. These views also further assist in depicting that low profile load bar assembly 112 is, indeed, located adjacent the top surface of deck 20 of bedslide 15, in contrast to the prior embodiments.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional patent application that may differ from the priority application, then the disclosure from this non-provisional patent application controls.

What is claimed:

1. A bedslide for use in a pickup truck cargo box, the bedslide comprising:

a deck;

at least one longitudinally extending track located adjacent a top surface of the deck;

at least one low profile load bar assembly that is movably positionable on the at least one longitudinally extending track;

wherein the at least one low profile load bar assembly includes at least one low profile sliding standoff movably coupled to the at least one longitudinally extending track;

wherein the at least one low profile sliding standoff includes at least one slider engageable with the at least one longitudinally extending track and attached to a connector flange;

wherein the at least a portion of the at least one low profile sliding standoff is located adjacent to the top surface of the deck;

wherein the connector flange is positioned on top of the longitudinally extending track;

wherein the at least one low profile sliding standoff further includes a load bar support that extends from the connector flange adjacent the deck;

wherein the load bar support is located adjacent to the at least one longitudinally extending track; and a load bar track;

wherein the load bar support includes a load bar opening sized and configured to receive the load bar track; and wherein an end of the load bar track is located adjacent the to the at least one longitudinally extending track.

2. The bedslide of claim 1, wherein the load bar track is located adjacent to the deck.

3. The bedslide of claim 1, further comprising a second longitudinally extending track extending about parallel with the at least one longitudinally extending track, wherein the at least one low profile load bar assembly includes a second low profile sliding standoff, wherein a second load bar support extends from the second low profile sliding standoff and supports the load bar track distal from the at least one low profile sliding standoff.

4. The bedslide of claim 1, wherein the load bar track includes a longitudinally extending channel configured to receive accessories.

5. The bedslide of claim 1, wherein the at least one low profile sliding standoff includes a plate that sits on top of the at least one longitudinally extending track.

6. The bedslide of claim 5, wherein the plate extends from a top surface of the load bar support.

7. The bedslide of claim 1, wherein the at least one low profile sliding standoff includes a plurality of sliders extending from an underside of the at least one low profile sliding standoff.

8. The bedslide of claim 1, wherein the load bar support includes a track tab that fits into a portion of the load bar track to support the load bar track.

9. The bedslide of claim 1, wherein a plurality of low profile load bar assemblies are engageable with the at least one longitudinally extending track.

10. The bedslide of claim 9, wherein each of the plurality of low profile load bar assemblies are movable to a plurality of locations on the at least one longitudinally extending track.

11. A bedslide for use in a pickup truck cargo box, the bedslide comprising:

a deck;

at least one longitudinally extending track located adjacent a top surface of the deck;

at least one low profile load bar assembly that is movably positionable on the at least one longitudinally extending track;

wherein the at least one low profile load bar assembly includes at least one low profile sliding standoff movably coupled to the at least one longitudinally extending track;

wherein the at least a portion of the at least one low profile sliding standoff is located adjacent to the top surface of the deck;

wherein the connector flange is positioned on top of the longitudinally extending track;

wherein the at least one low profile sliding standoff further includes a load bar support that extends therefrom adjacent the deck; and a load bar track;

wherein the load bar support includes a load bar opening sized and configured to receive the load bar track; and wherein the load bar track is located adjacent to the deck.

12. The bedslide of claim 11, wherein the at least one low profile sliding standoff includes at least one slider engageable with the at least one longitudinally extending track and attached to a connector flange.

13. The bedslide of claim 11, wherein the load bar support extends from a connector flange that is part of the at least one low profile sliding standoff.

14. The bedslide of claim 11, wherein the load bar support is located adjacent to the at least one longitudinally extending track.

15. The bedslide of claim 11, wherein an end of the load bar track is located adjacent the to the at least one longitudinally extending track.

16. The bedslide of claim 11, further comprising a second longitudinally extending track extending about parallel with the at least one longitudinally extending track, wherein the at least one low profile load bar assembly includes a second low profile sliding standoff, wherein a second load bar support extends from the second low profile sliding standoff and supports the load bar track distal from the at least one low profile sliding standoff.

17. A bedslide for use in a pickup truck cargo box, the bedslide comprising:

a deck;

at least one longitudinally extending track located adjacent a top surface of the deck;

at least one low profile load bar assembly that is movably positionable on the at least one longitudinally extending track;

wherein the at least one low profile load bar assembly includes at least one low profile sliding standoff movably coupled to the at least one longitudinally extending track;

wherein the at least one low profile sliding standoff includes at least one slider engageable with the at least one longitudinally extending track and attached to a connector flange;

wherein the at least one low profile sliding standoff further includes a load bar support that extends from the connector flange adjacent the deck;

wherein the at least a portion of the at least one low profile sliding standoff is located adjacent to the top surface of the deck;

wherein the connector flange is positioned on top of the longitudinally extending track;

wherein the load bar support is located adjacent to the at least one longitudinally extending track; and a load bar track;

wherein the load bar support includes a load bar opening sized and configured to receive the load bar track; and wherein the load bar track is located adjacent to the deck.

18. The bedslide of claim 17, further comprising a second longitudinally extending track extending about parallel with the at least one longitudinally extending track, wherein the at least one low profile load bar assembly includes a second low profile sliding standoff, wherein a second load bar support extends from the second low profile sliding standoff and supports the load bar track distal from the at least one low profile sliding standoff.

19. The bedslide of claim 17, wherein the at least one low profile sliding standoff includes a plate that sits on top of the at least one longitudinally extending track.

20. The bedslide of claim 19, wherein the plate extends from a top surface of the load bar support.

* * * * *